US009384497B2

(12) United States Patent  (10) Patent No.: US 9,384,497 B2
Calman et al.  (45) Date of Patent: Jul. 5, 2016

(54) USE OF SKU LEVEL E-RECEIPT DATA FOR FUTURE MARKETING

(71) Applicant: BANK OF AMERICA CORPORATION, Charlotte, NC (US)

(72) Inventors: Matthew A. Calman, Charlotte, NC (US); Jason P. Blackhurst, Charlotte, NC (US); Katherine Dintenfass, Charlotte, NC (US); Laura C. Bondesen, Charlotte, NC (US); Carrie A. Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 13/952,023

(22) Filed: Jul. 26, 2013

(65) Prior Publication Data

US 2015/0032546 A1    Jan. 29, 2015

(51) Int. Cl.
*G06F 7/00* (2006.01)
*G06Q 30/02* (2012.01)

(52) U.S. Cl.
CPC ........ G06Q 30/0251 (2013.01); G06Q 30/0264 (2013.01)

(58) Field of Classification Search
CPC .......... G06F 2213/3852; G06F 13/387; G06F 3/023; G06F 3/1243; G06Q 30/0251; G06Q 30/0264; H05K 999/00
USPC ........................... 707/751, 755, 756, 999.107
See application file for complete search history.

(56) References Cited

U.S. PATENT DOCUMENTS

| | | |
|---|---|---|
| 5,717,923 A | 2/1998 | Dedrick |
| 5,761,648 A | 6/1998 | Golden et al. |
| 5,870,770 A | 2/1999 | Wolfe |
| 5,907,830 A | 5/1999 | Engel et al. |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,073,112 A | 6/2000 | Geerlings |
| 6,076,069 A | 6/2000 | Laor |
| 6,223,163 B1 | 4/2001 | Van Luchene |

(Continued)

OTHER PUBLICATIONS

Related U.S. Appl. No. 13/013,683, filed Jan. 25, 2011.
Related U.S. Appl. No. 13/013,684, filed Jan. 25, 2011.
Related U.S. Appl. No. 13/013,685, filed Jan. 25, 2011.
Related U.S. Appl. No. 13/013,688, filed Jan. 25, 2011.
Related U.S. Appl. No. 13/013,689, filed Jan. 25, 2011.
Related U.S. Appl. No. 13/013,691, filed Jan. 25, 2011.
Related U.S. Appl. No. 13/013,720, filed Jan. 25, 2011.

(Continued)

*Primary Examiner* — Mohammed R Uddin
(74) *Attorney, Agent, or Firm* — Michael A. Springs; Moore & Van Allen PLLC

(57) ABSTRACT

Embodiments of the invention relate to systems, methods, and computer program products for determining and providing an offer to a customer based at least in part on product level data associated with a transaction. The system, method, and computer program product are configured to receive unstructured data from a customer account, wherein the unstructured data comprises product level data for a transaction; convert the unstructured data into structured data; determine a transaction at a financial institution corresponding to the structured data; determine an offer for a customer based on the product level data and the transaction; and provide the offer to the customer. Typically, product level data related to transactions is not available to financial institution. This disclosure describes a system and method for identifying and using product level data.

17 Claims, 7 Drawing Sheets

(56) References Cited

U.S. PATENT DOCUMENTS

| | | | |
|---|---|---|---|
| 6,263,351 B1 | 7/2001 | Wolfe | |
| 6,282,567 B1 | 8/2001 | Finch, II et al. | |
| 6,292,786 B1 | 9/2001 | Deaton et al. | |
| 6,292,813 B1 | 9/2001 | Wolfe | |
| 6,317,718 B1 | 11/2001 | Fano | |
| 6,321,208 B1 | 11/2001 | Barnett et al. | |
| 6,330,543 B1 | 12/2001 | Kepecs | |
| 6,332,126 B1 | 12/2001 | Peirce et al. | |
| 6,336,099 B1 | 1/2002 | Barnett et al. | |
| 6,336,131 B1 | 1/2002 | Wolfe | |
| 6,341,305 B2 | 1/2002 | Wolfe | |
| 6,349,290 B1 | 2/2002 | Horowitz et al. | |
| 6,385,592 B1 | 5/2002 | Angles et al. | |
| 6,434,534 B1 | 8/2002 | Walker et al. | |
| 6,505,168 B1 | 1/2003 | Rothman et al. | |
| 6,611,814 B1 | 8/2003 | Lee et al. | |
| 6,615,184 B1 | 9/2003 | Hicks | |
| 6,622,174 B1 | 9/2003 | Ukita et al. | |
| 6,678,685 B2 | 1/2004 | McGill et al. | |
| 6,782,370 B1 | 8/2004 | Stack | |
| 6,865,545 B1 | 3/2005 | Epstein et al. | |
| 6,925,444 B1 | 8/2005 | McCollom et al. | |
| 6,937,995 B1 | 8/2005 | Kepecs | |
| 7,024,374 B1 | 4/2006 | Day et al. | |
| 7,043,526 B1 | 5/2006 | Wolfe | |
| 7,099,832 B2 | 8/2006 | Walker et al. | |
| 7,124,096 B2 | 10/2006 | Dutta et al. | |
| 7,127,414 B1 | 10/2006 | Awadallah et al. | |
| 7,162,443 B2 | 1/2007 | Shah | |
| 7,181,488 B2 | 2/2007 | Martin et al. | |
| 7,228,285 B2 | 6/2007 | Hull et al. | |
| 7,231,357 B1 | 6/2007 | Shanman et al. | |
| 7,236,942 B1 | 6/2007 | Walker et al. | |
| 7,246,310 B1 | 7/2007 | Wolfe | |
| 7,249,058 B2 | 7/2007 | Kim et al. | |
| 7,257,604 B1 | 8/2007 | Wolfe | |
| 7,302,429 B1 | 11/2007 | Wanker | |
| 7,302,638 B1 | 11/2007 | Wolfe | |
| 7,315,834 B2 | 1/2008 | Martineau et al. | |
| 7,324,965 B2 | 1/2008 | Martineau et al. | |
| 7,340,419 B2 | 3/2008 | Walker et al. | |
| 7,356,490 B1 | 4/2008 | Jacobi et al. | |
| 7,386,477 B2 | 6/2008 | Fano | |
| 7,398,248 B2 | 7/2008 | Phillips et al. | |
| 7,433,874 B1 | 10/2008 | Wolfe | |
| 7,464,050 B1 | 12/2008 | Deaton et al. | |
| 7,472,088 B2 | 12/2008 | Taylor et al. | |
| 7,490,056 B2 | 2/2009 | Nash | |
| 7,512,551 B2 | 3/2009 | Postrel | |
| 7,536,385 B1 | 5/2009 | Wolfe | |
| 7,552,080 B1 | 6/2009 | Willard et al. | |
| 7,578,435 B2 | 8/2009 | Suk | |
| 7,593,862 B2 | 9/2009 | Mankoff | |
| 7,599,850 B1 | 10/2009 | Laor | |
| 7,606,736 B2 | 10/2009 | Martineau et al. | |
| 7,627,588 B1 * | 12/2009 | Mohan et al. | |
| 7,672,870 B2 | 3/2010 | Haines et al. | |
| 7,698,170 B1 * | 4/2010 | Darr et al. | 705/26.35 |
| 7,720,720 B1 * | 5/2010 | Sharma et al. | 705/26.7 |
| 7,761,344 B2 | 7/2010 | Smith | |
| 7,783,515 B1 * | 8/2010 | Kumar et al. | 705/16 |
| 7,870,021 B2 | 1/2011 | Mankoff | |
| 7,979,319 B2 | 7/2011 | Toulotte | |
| 8,260,645 B2 | 9/2012 | Banerjee et al. | |
| 8,326,690 B2 | 12/2012 | Dicker et al. | |
| 8,675,221 B1 * | 3/2014 | Tahiliani et al. | 358/1.15 |
| 2002/0062249 A1 | 5/2002 | Iannacci | |
| 2002/0091571 A1 | 7/2002 | Thomas et al. | |
| 2002/0156817 A1 * | 10/2002 | Lemus | 707/531 |
| 2002/0190118 A1 | 12/2002 | Davenport et al. | |
| 2004/0024703 A1 * | 2/2004 | Roskind | 705/40 |
| 2004/0049738 A1 * | 3/2004 | Thompson et al. | 715/513 |
| 2004/0226995 A1 | 11/2004 | Smith | |
| 2005/0055275 A1 * | 3/2005 | Newman et al. | 705/14 |
| 2005/0097015 A1 * | 5/2005 | Wilkes et al. | 705/30 |
| 2005/0173517 A1 | 8/2005 | Suk et al. | |
| 2005/0177437 A1 | 8/2005 | Ferrier | |
| 2007/0005426 A1 | 1/2007 | Walker et al. | |
| 2007/0106686 A1 * | 5/2007 | Shank et al. | 707/102 |
| 2007/0136418 A1 | 6/2007 | Wolfe | |
| 2007/0255620 A1 | 11/2007 | Tumminaro et al. | |
| 2008/0086365 A1 | 4/2008 | Zollino et al. | |
| 2008/0091535 A1 | 4/2008 | Heiser, II et al. | |
| 2008/0133336 A1 | 6/2008 | Altman et al. | |
| 2008/0162316 A1 | 7/2008 | Rampell et al. | |
| 2008/0221986 A1 | 9/2008 | Soicher et al. | |
| 2008/0249941 A1 | 10/2008 | Cooper | |
| 2008/0277465 A1 | 11/2008 | Pletz et al. | |
| 2009/0012541 A1 | 1/2009 | Dahl et al. | |
| 2009/0094125 A1 | 4/2009 | Killian et al. | |
| 2009/0132366 A1 | 5/2009 | Lam et al. | |
| 2009/0132415 A1 | 5/2009 | Davis et al. | |
| 2009/0170483 A1 | 7/2009 | Barnett et al. | |
| 2009/0172728 A1 | 7/2009 | Shkedi et al. | |
| 2009/0271275 A1 | 10/2009 | Regmi et al. | |
| 2009/0292599 A1 | 11/2009 | Rampell et al. | |
| 2009/0313106 A1 | 12/2009 | Taylor et al. | |
| 2009/0319638 A1 | 12/2009 | Faith et al. | |
| 2010/0257066 A1 * | 10/2010 | Jones et al. | 705/17 |
| 2010/0260426 A1 | 10/2010 | Huang et al. | |
| 2011/0082728 A1 | 4/2011 | Melikian | |
| 2011/0264490 A1 | 10/2011 | Durvasula et al. | |
| 2011/0264502 A1 * | 10/2011 | Taylor et al. | 705/14.25 |
| 2011/0282748 A1 * | 11/2011 | Ciurea | 705/14.64 |
| 2012/0078610 A1 * | 3/2012 | Sayal et al. | 704/9 |
| 2012/0130788 A1 | 5/2012 | Winslade et al. | |
| 2012/0191565 A1 * | 7/2012 | Blank | G06Q 30/0641 705/26.8 |
| 2012/0209673 A1 | 8/2012 | Park | |
| 2012/0239481 A1 * | 9/2012 | Yankovich | G06Q 30/0207 705/14.25 |
| 2012/0278165 A1 | 11/2012 | Mercuri et al. | |
| 2012/0330971 A1 * | 12/2012 | Thomas et al. | 707/748 |
| 2012/0330973 A1 * | 12/2012 | Ghuneim et al. | 707/748 |
| 2013/0009774 A1 * | 1/2013 | Sabeta | G06Q 30/016 340/540 |
| 2013/0024525 A1 * | 1/2013 | Brady et al. | 709/206 |
| 2013/0151344 A1 * | 6/2013 | Tavares et al. | 705/14.65 |
| 2013/0215116 A1 * | 8/2013 | Siddique et al. | 345/420 |
| 2014/0006150 A1 * | 1/2014 | Thompson et al. | 705/14.53 |
| 2014/0019507 A1 * | 1/2014 | Slakman et al. | 709/201 |
| 2014/0032259 A1 * | 1/2014 | LaFever et al. | 705/7.29 |
| 2014/0214566 A1 * | 7/2014 | High et al. | 705/17 |
| 2014/0244462 A1 * | 8/2014 | Maenpaa et al. | 705/35 |
| 2014/0372198 A1 * | 12/2014 | Goldfinger et al. | 705/14.33 |
| 2015/0025995 A1 * | 1/2015 | Yuan et al. | 705/26.7 |
| 2015/0046304 A1 * | 2/2015 | Bondesen et al. | 705/31 |
| 2015/0073929 A1 * | 3/2015 | Psota et al. | 705/26.2 |

OTHER PUBLICATIONS

Related U.S. Appl. No. 13/013,722, filed Jan. 25, 2011.
Related U.S. Appl. No. 13/013,727, filed Jan. 25, 2011.
Related U.S. Appl. No. 13/013,730, filed Jan. 25, 2011.
Related U.S. Appl. No. 13/013,731, filed Jan. 25, 2011.
International Search Report and the Written Opinion of the International Searching Authority mailed Mar. 25, 2011 for International Application No. PCT/US11/22781.
International Search Report and the Written Opinion of the International Searching Authority mailed Mar. 25, 2011 for International Application No. PCT/US11/22783.
International Search Report and the Written Opinion of the International Searching Authority mailed Mar. 28, 2011 for International Application No. PCT/US11/22771.
International Search Report and the Written Opinion of the International Searching Authority mailed Mar. 29, 2011 for International Application No. PCT/US11/22779.
International Search Report and the Written Opinion of the International Searching Authority mailed Mar. 29, 2011 for International Application No. PCT/US11/22785.
International Search Report and the Written Opinion of the International Searching Authority mailed Apr. 8, 2011 for International Application No. PCT/US11/2265.

* cited by examiner

| ? | DATE | DESCRIPTION | AMOUNT | BALANCE |
|---|---|---|---|---|
| | PROCESSING | CHECK CARD ON XX/XX/XXXX | XX.XX | XXX.XX |
| | PROCESSING | MERCHANT 1 | XX.XX | XXX.XX |
| | PROCESSING | ATM WITHDRAWAL | XX.XX | XXX.XX |
| | XX/XX/XXXX | CHECK NUMBER XXX | XX.XX | XXX.XX |
| | XX/XX/XXXX | CHECK CARD ON XX/XX/XXXX | XX.XX | XXX.XX |
| X | XX/XX/XXXX | MERCHANT 2 | XX.XX | XXX.XX |
| | XX/XX/XXXX | TRANSFER TO ACCOUNT # XXXX | XX.XX | XXX.XX |
| | XX/XX/XXXX | CHECK CARD ON XX/XX/XXXX | XX.XX | XXX.XX |
| | XX/XX/XXXX | ATM WITHDRAWAL | XX.XX | XXX.XX |
| | XX/XX/XXXX | MERCHANT 3 | XX.XX | XXX.XX |

Tabs: ACCOUNTS | TRANSFERS | CUSTOMER SERVICE

INFORMATION ON SELECTED TRANSACTION

WE HAVE DETERMINED THAT THE PURCHASE AT MERCHANT 2 ON XX/XX/XXXX CORRESPONDS TO THE ONLINE PURCHASE OF A HANDHELD DEVICE, A MONITOR, AND A LAPTOP IN THIS E-RECEIPT

FIG. 4

DEAR XXXX, YOU PURCHASED THE XXX BICYCLE ON DATE.

REPLACE THE BICYCLE WITH THE NEWEST MODEL

ADVANCEMENTS: LIGHTER WEIGHT, STRONGER CHASSIS

REPLACE THE BICYCLE WITH A DIFFERENT BRAND

ADVANCEMENTS: SAFETY LIGHTS, LONGER WARRANTY

REPLACE THE BICYCLE THROUGH A DIFFERENT MERCHANT

ADVANTAGES: LOWER COST, LONGER WARRANTY

FIG. 5

DEAR XXXX, YOU PURCHASED THE XXX GRILL ON DATE.

PLEASE NOTE THAT THE MANUFACTURER OF THE GRILL HAS ISSUED A RECALL OF THIS PRODUCT DUE TO A FAULTY TURN OFF SWITCH

YOU PURCHASED THE GRILL AT MERCHANT XX ON DATE XX FOR $XXX.00

PLEASE CALL XXX-XXX-XXXX TO SPEAK WITH A REPRESENTATIVE OF THE MANUFACTURER REGARDING THE RECALL

FIG. 6

DEAR XXXX, YOU PURCHASED THE XXX MEDICINE ON DATE.

DID YOU KNOW THAT MEDICINE HAS A SHELF LIFE OF XX MONTHS

IF YOU WOULD LIKE TO ORDER A REPLACEMENT OF THE OVER THE COUNTER MEDICINE, PLEASE CLICK HERE

MERCHANT X IS OFFERING A SALE ON A GENERIC OF THE OVER THE COUNTER MEDICINE

FIG. 7

USE OF SKU LEVEL E-RECEIPT DATA FOR FUTURE MARKETING

BACKGROUND

Financial institutions desire to provide appropriate and helpful offers to customers in order to make customers aware of new products and services, advantages over the customer's current products and services, and competitive offers from merchants. Financial institution may market offers to customers from the financial institution, from merchants, or from other customers. Currently, however, financial institutions are limited in the information available to provide appropriate offers to customers. In particular, financial institutions lack product level data on transactions conducted by customers.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In a first aspect, a system for providing an offer to a customer is provided. In some embodiments, the system includes a computer apparatus including a processor and a memory; and a software module stored in the memory, comprising executable instructions that when executed by the processor cause the processor to: receive unstructured data from a customer account, wherein the unstructured data comprises product level data for a transaction; convert the unstructured data into structured data; determine a transaction at a financial institution corresponding to the structured data; determine an offer for a customer based on the product level data and the transaction; and provide the offer to the customer. In some embodiments, the system also includes executable instructions that when executed by the processor cause the processor to determine a format of the unstructured data.

In a second aspect, a computer program product for providing an offer to a customer is provided. In some embodiments, the computer program product includes a non-transitory computer readable storage medium having computer readable program code embodied therewith, the computer readable program code comprising: a computer readable program code configured to receive unstructured data from a customer account, wherein the unstructured data comprises product level data for a transaction; a computer readable program code configured to convert the unstructured data into structured data; a computer readable program code configured to determine a transaction at a financial institution corresponding to the structured data; a computer readable program code configured to determine an offer for a customer based on the product level data and the transaction; and a computer readable program code configured to provide the offer to the customer.

In a third aspect, a method for providing an offer to a customer is provided. In some embodiments, the method includes receiving unstructured data from a customer account, wherein the unstructured data comprises product level data for a transaction; converting, via a computing device processor, the unstructured data into structured data; determining, via a computing device processor, a transaction at a financial institution corresponding to the structured data; determining, via a computing device processor, an offer for a customer based on the product level data and the transaction; and providing the offer to the customer.

In further embodiments, converting the unstructured data into structured data is based at least in part on the format. In some embodiments, the unstructured data is received from a source selected from the group consisting of a customer email account and a customer account page. In still further embodiments, the unstructured data is present in an e-receipt. In an embodiment, the product level data comprises at least one of an SKU code, an image of a product, a serial number of a product, and a name of a product. In a still further embodiment, the offer is determined based on a period of time since the transaction.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
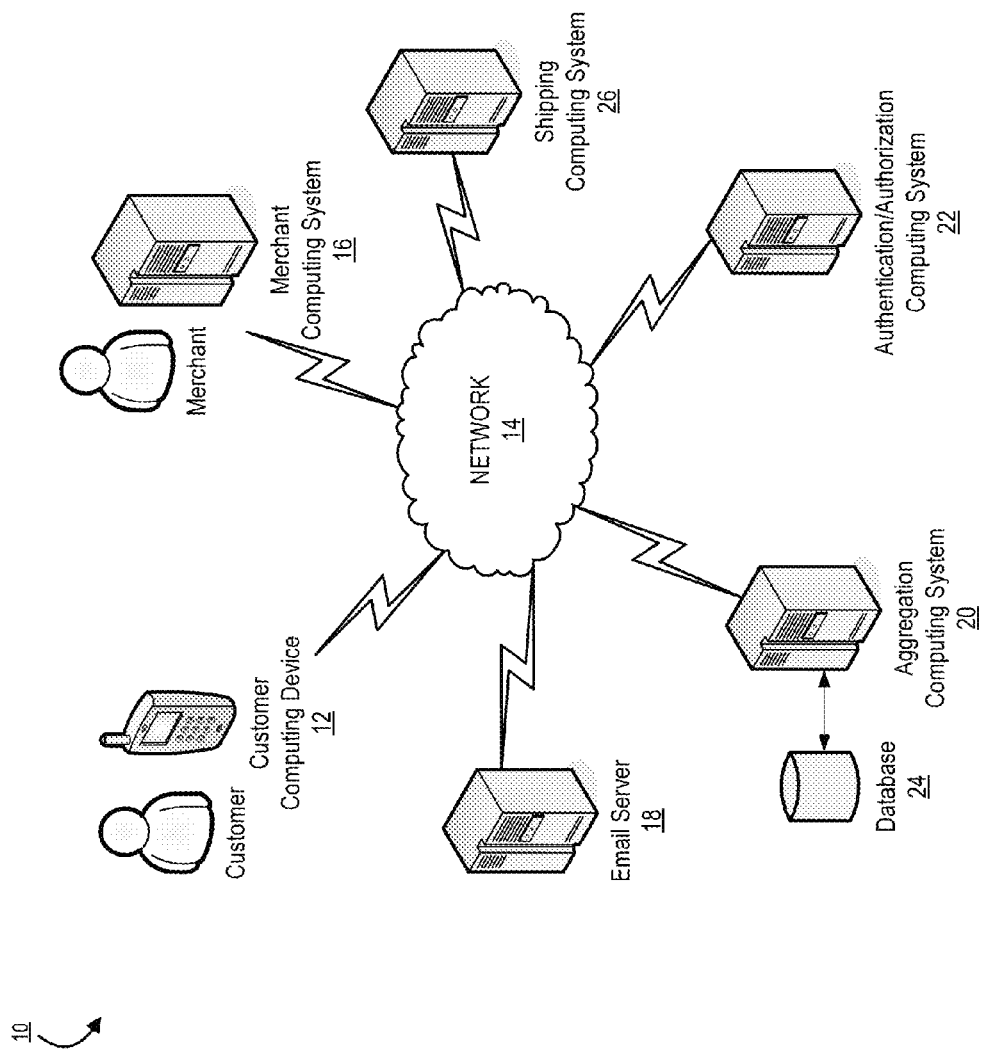
Figure 2:
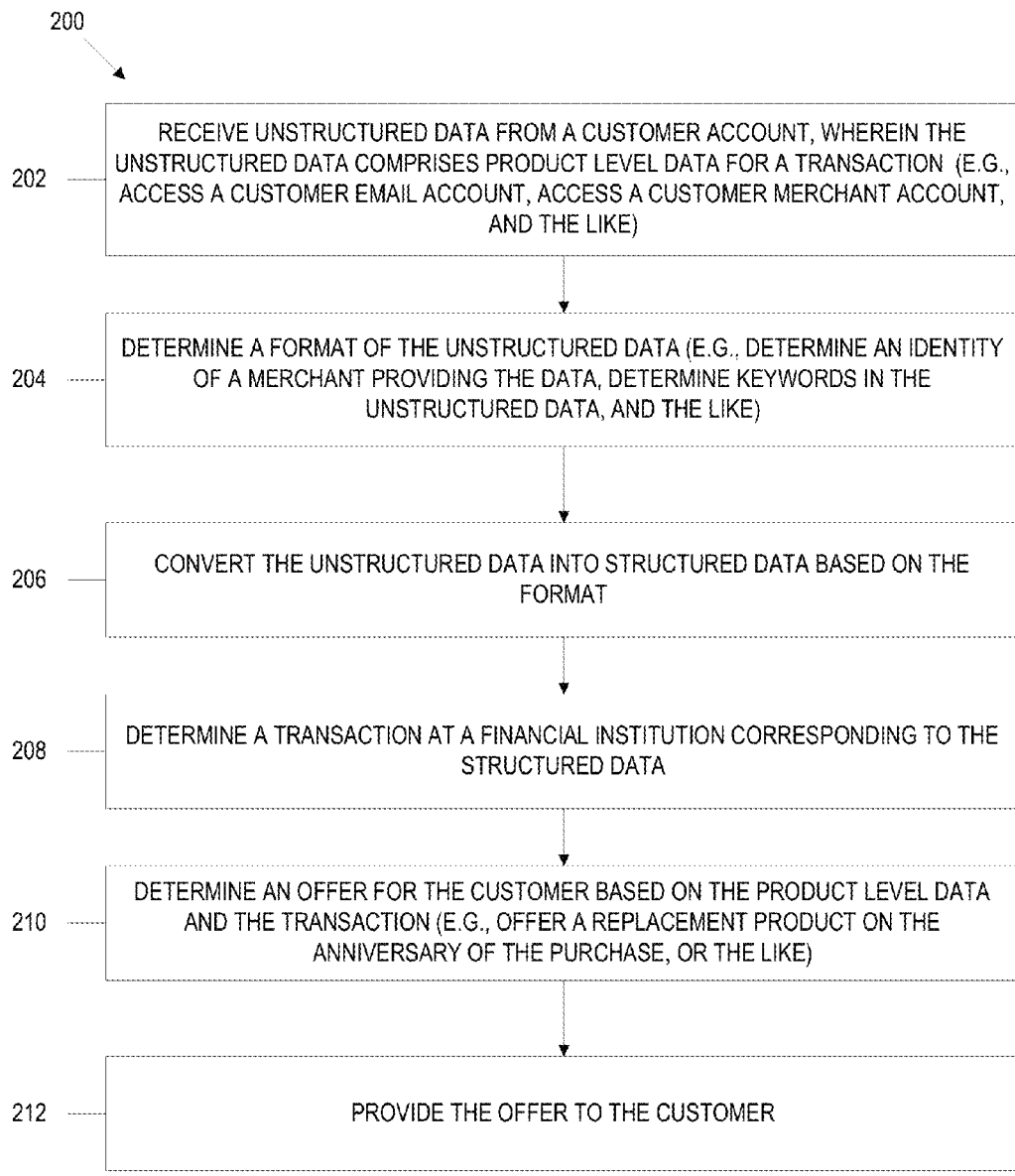
Figure 3:
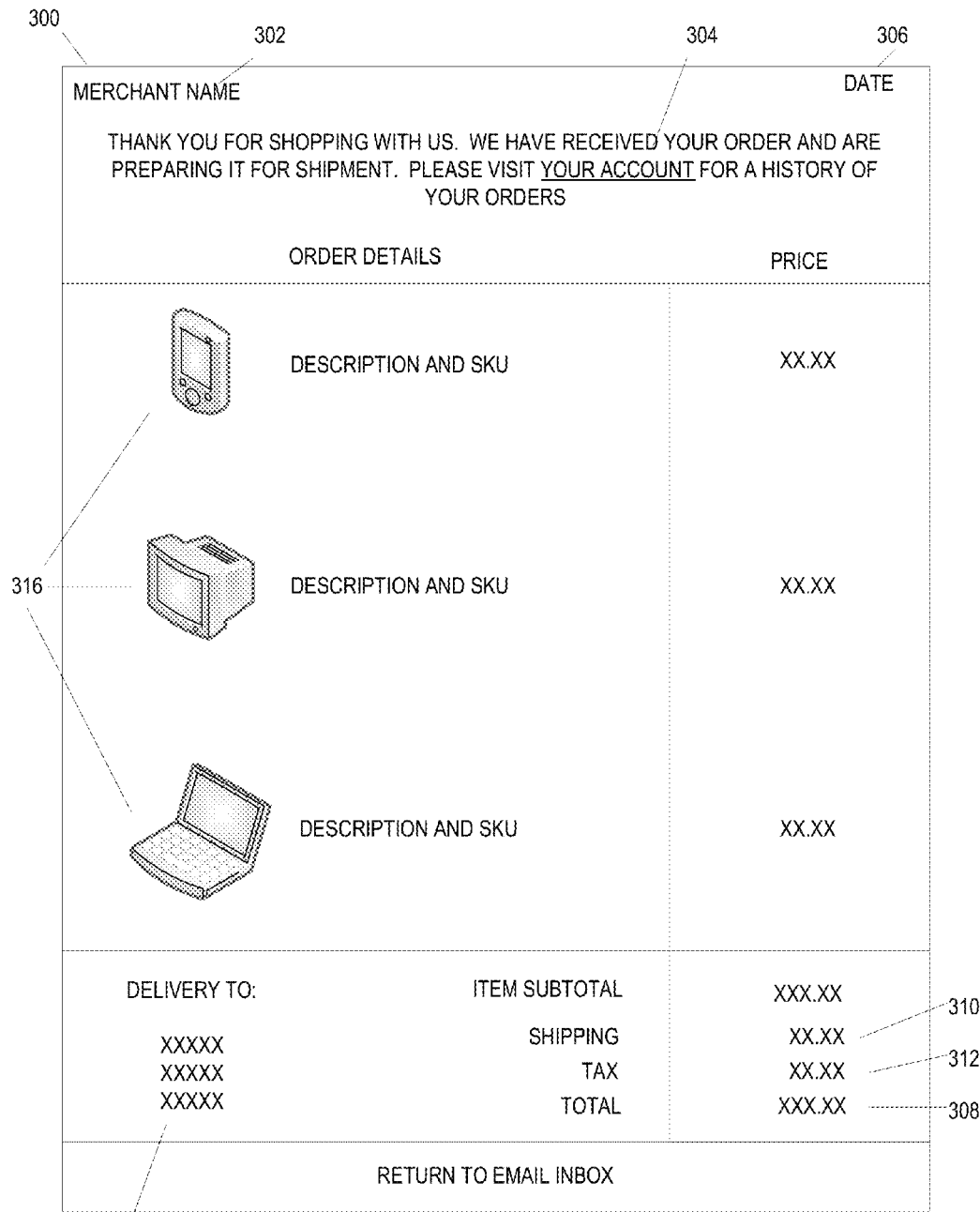

Having thus described embodiments of the invention in general terms, reference will now be made to the accompanying drawings, which are not necessarily drawn to scale, and wherein:

FIG. 1 is a diagram of an operating environment according to one embodiment of the present invention for retrieval of electronic communications relating to customer purchase transactions, parsing of data within such electronic communications into structured data, and inclusion of such data into online banking;

FIG. 2 provides a high level process flow illustrating a method of determining an offer for a customer based on product-level data, in accordance with one embodiment of the present disclosure;

FIG. 3 is an exemplary embodiment of an e-receipt associated with the method, in accordance with embodiments of the disclosure;

FIG. 4 is an exemplary embodiment of an account register associated with the method, in accordance with embodiments of the disclosure;

FIG. 5 is an exemplary screenshot of a graphical representation of an offer to replace a product for a customer determined using the method, in accordance with embodiments of the disclosure;

FIG. 6 is an exemplary screenshot of a graphical representation of an offer based on a recall for a customer determined using the method, in accordance with some embodiments of the disclosure; and FIG. 7 is an exemplary screenshot of a graphical representation of an offer based on a period of time for a product determined using the method, in accordance with some embodiments of the disclosure.

DETAILED DESCRIPTION OF EMBODIMENTS OF THE INVENTION

Embodiments of the present disclosure now may be described more fully hereinafter with reference to the accompanying drawings, in which some, but not all, embodiments of the disclosure are shown. Indeed, many different forms may be possible and the disclosure should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although embodiments of the present invention described herein are generally described as involving a merchant, it will be understood that merchant may involve one or more persons, organizations, businesses, institutions and/or other entities such as financial institutions, that implement one or more portions of one or more of the embodiments described and/or contemplated herein.

In the past few years, there has been an increase in the amount of electronic information provided by merchants to customers regarding purchase of products and services. In the online purchase context, various electronic communications may be provided to the customer from the merchant relative to a purchase. For example, the merchant may provide the customer an electronic order confirmation communication following an online purchase. The order confirmation may be sent to the customer's computer and displayed in a web browser application. The web browser application typically allows the customer to print a hard copy of the order confirmation and to save the confirmation electronically. The merchant will also typically send an email containing the order confirmation to the customer's designated email account. The order confirmation is essentially an e-receipt for the online purchase. The order confirmation includes detailed information regarding the products or services purchased. For example, in the case of a product, the order confirmation may include stock keeping unit "SKU" code level data, as well as other parameters, such as order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. The order confirmation also includes information about the merchant, such as name, address, phone number, web address, and the like. For most online transactions, the merchant will send at least one second communication confirming shipment of the order. The order shipment confirmation is typically also sent via email to the customer and typically includes the same information as the order confirmation, and in addition, shipping date, tracking number, and other relevant information regarding the order and shipment parameters.

Many merchants now also provide e-receipts to customers shopping at brick and mortar locations. In general, at the point of sale, the customer may have previously configured or may be asked at the time of sale as to whether she wishes to receive an e-receipt. By selecting this option, the merchant will send an electronic communication in the form of an e-receipt to the customer's designated email address. Here again, the e-receipt will typically include a list of services and/or products purchased with SKU level data, and other parameters, as well as information about the merchant, such as name, address, phone number, store number, web address, and the like.

Various merchants now also provide online customer accounts for repeat customers. These online customer accounts may include purchase history information associated with the customer accessible by the customer via ID and passcode entry. Purchase history provides detailed information about services and products purchased by the customer including information found on order confirmations and shipping confirmations for each purchase. Online customer accounts are not limited to online purchases. Many merchants also provide online customer accounts for customers that purchase services and products at brick and mortar locations and then store these transactions in the customer's online account.

For the most part, order confirmations, shipping confirmations, e-receipts, and other electronic communications between merchants and customers are used only by the customer as proof of purchase and for monitoring receipt of purchased items (i.e., for archival purposes). However, there is significant data that can be gleaned from this electronic information for the benefit of the customer, so that the customer may have detailed information regarding purchase history, spending, and the like.

Another development in the past few years has been the growth of online banking, whereby financial institution customers, (such as bank and credit card customers), may view financial account transaction data, perform online payments and money transfers, view account balances, and the like. Many current online banking applications are fairly robust and provide customers with budgeting tools, financial calculators, and the like to assist the customer to not only perform and view financial transaction data, but also to manage finances. A current drawback with online banking is that transactional level detail for a given purchase by the customer is limited. Despite the large amount of information sent by merchants to customers regarding purchases, merchants currently do not provide purchase details to financial institutions. The only information provided to the financial institution is information about the merchant and an overall transaction amount. For example, if a financial institution customer purchases several clothing items from a merchant and uses a financial institution debit card, credit card or check, all that is provided to the financial institution is the merchant information and overall purchase. Product level detail that is present on the receipt provided to the customer by the merchant is not provided to the financial institution.

The lack of detailed information regarding a given transaction in the online banking environment limits a customer's ability to ascertain a larger picture of purchase history and financial transaction information. As a first example, if a customer makes several purchases within a short time period with a particular merchant, all that the customer will see in online banking for each purchase is an overall dollar amount, the merchant name, and date of the purchase transaction. If the customer cannot recall what a particular purchase was for or whether it was a legitimate transaction, the customer cannot view details regarding the purchase via online banking to aid in the inquiry. Instead, the customer must locate and review receipts from the purchases and match them by date and/or total purchase amount to online banking data to perform such analysis.

Lack of detailed purchase information also hinders use of other financial tools available to the customer in online banking, such as budget tools. In general, budget tools divide expenses into various categories, such as food, clothing, housing, transportation, and the like. It is typically advantageous to provide such budget tools with online banking information to populate these various categories with spend information. However, this is difficult where specifics regarding a purchase made by the merchant (such as SKU level data) are not provided by the merchant to the financial institution for a given financial transaction. As many stores provide a wide variety of services and products, such as in the case of a "big box" store that provides groceries, clothing, house hold goods, automotive products, and even fuel, it is not possible to dissect a particular purchase transaction by a customer at the merchant for budget category purposes. For this reason, many current online budgeting tools may categorize purchases for budgeting by merchant type, such as gas station purchases are categorized under transportation and grocery store purchases are categorized under food, despite that in reality, the purchase at the gas station may have been for food or the purchase at the grocery store could have been for fuel. Alternatively, some budget tools may allow a customer to parse the total amount of a purchase transaction between budget categories by manually allocating amounts from the purchase transaction between each budget category. This requires added work by the customer and may be inaccurate if the customer is not using the receipt in making such allocations.

Customer cash purchases are also problematic for integration of customer purchase transactions into online banking. In a cash transaction, the customer may initially withdraw cash from a financial account and then use the money for a purchase. In this instance, the customer's online banking will have no information whatsoever regarding the purchase transaction with a merchant, as there is no communication regarding the purchase transaction between the financial institution and the merchant. For example, if the customer uses cash to purchase fuel at a gas station, the financial institution has no way of determining that the purchase transaction occurred and cannot use such information for notifying customer of spending or budgeting regarding the fuel purchase.

As described above, currently financial institutions are not provided with detailed transaction level information regarding a purchase transaction by a customer from a merchant beyond merchant information and overall transaction price for inclusion in online banking. While detailed data (such as SKU level data) is provided to the customer via receipts, such information is not provided by the merchant to the financial institution. The information is available to the customer but not integratable into a customer's online banking for efficient and increased beneficial use of the information. Currently, a customer must retain her receipts and manually compare such receipts with online purchase transaction data to obtain an understanding of the details of a given purchase transaction.

In light of the above, the current invention contemplates use of e-receipt data and other electronic communication data between a merchant and customer regarding a transaction in order to augment purchase transaction data in online banking. The general concept is to retrieve such electronic communications from the customer, parse the data in these electronic communications, and associate the data from the electronic communications with the corresponding online purchase transaction data.

An initial barrier to integration of electronic communication data received by a customer from a merchant regarding a purchase transaction for inclusion into online banking is data format. Online banking data is in a structured form. Financial institutions currently use a data structure conforming to Open Financial Exchange "OFX" specifications for the electronic exchange of financial data between financial institutions, businesses and customers via the Internet. E-receipts, such as electronic order confirmations, shipment confirmation, receipts, and the like typically do not comply to a uniform structure and are generally considered to include data in an "unstructured" format. For example, while one merchant may provide data in an electronic communication to a customer in one format, another merchant may use a completely different format. One merchant may include merchant data at the top of a receipt and another merchant may include such data at the bottom of a receipt. One merchant may list the purchase price for an item on the same line as the description of the item and list the SKU number on the next line, while another merchant may list the data in a completely opposite order. As such, prior to integration of electronic communications relating to customer purchases into online banking, the data from such electronic communications must be parsed into a structured form.

FIG. 1 is a diagram of an operating environment 10 according to one embodiment of the present invention for retrieval of electronic communications relating to customer purchase transactions, parsing of data within such electronic communications into structured data, and inclusion of such data into online banking. As illustrated a consumer maintains one or more computing devices 12, such as a PC, laptop, mobile phone, tablet, television, or the like that is network enabled for communicating across a network 14, such as the Internet, wide area network, local area network, Bluetooth network, near field network, or any other form of contact or contactless network. Also, one or more network-enabled merchant computing systems 16 may be in the operating environment. In the context of an online shopping experience, the merchant computing system 16 may be one or more financial transaction servers that, either individually or working in concert, are capable of providing web pages to a customer via the network 14, receiving purchase orders for items selected by the customer, communicating with the customer and third party financial institutions to secure payment for the order, and transmitting order confirmation, and possibly shipping confirmation information, to the customer via the network 14 regarding the purchase transaction. In the context of an in-store purchase, the merchant computing system 16 may include a point of sale terminal for scanning or receiving information about products or services being purchased by the customer and communicating with the customer and third party financial institutions to secure payment for the order. Either the point of sale device or a connected merchant server may be used to communicate order confirmation or purchase confirmation information to the customer related to the purchase transaction. If the customer has an online account with the merchant, the merchant computing system may also log the transaction information into the customer's online account.

In general, the merchant computing system will provide the customer with information relating to the purchase transaction. In the context of an online purchase, the communications may take the form of purchase order confirmations provided as a web page or as an email or as both. In some embodiments, the merchant computing system may provide a web page purchase order confirmation and advise the customer to either print, electronically save, or book mark the confirmation web page. The purchase order confirmation is essentially an e-receipt for the online purchase transaction. The order confirmation includes detailed information regarding the products or services purchased, such as for example, in the case of a product, SKU code level data, as well as other parameters associated with the product, such as type/category, size, color, and the like, as well purchase price information, information associated with the merchant, and the like. The merchant computing system may also send other subsequent communications, such as communications confirming shipment of the order, which typically includes the same information as the purchase order confirmation, and in addition, shipping date, tracking number, and other relevant information regarding the order. In the context of an in-store purchase, the merchant computing system may send an e-receipt comprising information similar to that of the purchase order confirmation. In some instances, the customer may actually receive a paper receipt, which the customer may choose to scan into an electronic form and save in a storage device associated with the customer computing device 12. In the description herein, the term e-receipt may be used generically to refer to any communication or document provided by a merchant to a customer relating to a purchase transaction.

For a plurality of different purchase transactions, a customer may include purchase transaction related data (e.g., order confirmations, shipping confirmations, e-receipts, scanned receipts, typed or handwritten notes, invoices, bills of sale, and the like) in various locations and in various forms. The purchase related data could be stored in a storage device associated with the customer computing device 12, or in an email server 18, or in a customer's account at the merchant's computing system 16. Furthermore, as mentioned, the purchase transaction related information is in an unstructured format. Each merchant may use a customized reporting format for the communications, whereby various data relating to the purchase transaction may be placed in different sequences, different locations, different formats, and the like for a given merchant. Indeed, a given merchant may even use different data formatting and structuring for different communications with the customer (e.g., order confirmation, shipping, confirmation, e-receipt, online customer account information, and the like).

To aggregate and structure data related to purchase transactions, the operating environment further comprises an aggregation computing system 20. The aggregation computing system is operatively connected to at least one of the customer computing device 12, the merchant computing system 16, and the email server 18 via the network 14. The aggregation computing system is configured to initially search and locate electronic communications associated with purchase transactions made by the customer, in for example, the customer's email, computer storage device, online accounts, and the like. For this purpose, the system may optionally include an authentication/authorization computing system 22 that comprises security IDs and passwords and other security information associated with the customer for accessing customer's email, storage devices, and customer online accounts.

Regarding email extraction, aggregation computing system 20 initially gains access to the customer's email accounts and retrieves email message headers comprising data fields relative to the email message, such as sender, subject, date/time sent, recipient, and the like. In some embodiments, the aggregation computing system accesses the emails directly. In other embodiments, the aggregation computing system may run search queries of the email database based on known merchant names and/or phrases associated with e-receipt information, such as "receipt," "order confirmation," "shipping confirmation," or the like. Once emails are extracted, further filtering may occur to locate relevant emails. Examples of further filtering may be searches based on known online merchants, third parties known to provide e-receipts, text in the email message subject line that corresponds to known order confirmation subject line text or known shipping confirmation subject line text, such as an email message sent with a subject line containing the text "purchase," "order," "ordered," "shipment," "shipping," "shipped," "invoice," "confirmed," "confirmation," "notification," "receipt," "e-receipt," "ereceipt," "return," "pre-order," "preordered," "tracking," "on its way," "received," "fulfilled," "package," and the like.

Based on the email header analysis, the message bodies for emails of interest may then be accessed. The retrieved email message bodies for the identified email messages of interest are parsed to extract the purchase transaction information and/or shipping information contained therein. Such parsing operation can occur in a variety of known ways. However, because the text contained in email message bodies is unstructured (as opposed to the structured tagged elements in a hypertext markup language (HTML) web page which delineate and make recognizable the various fields or elements of the web page), in one embodiment predefined templates are used that have been specifically created to identify the various individual elements or entities of interest in a given email from an online merchant. Use of these predefined templates to parse a retrieved email message body occurs within aggregation computing system 20. Because it is known from header information which merchant sent the email message of interest and whether the email message is a purchase order confirmation or a shipping confirmation from either the header or the message body information, a template specific to the merchant and type of confirmation may be used. Still further, because email message bodies can, as is known in the art, be in either a text or HTML format, a template specific to the type of email message body format may be used in some embodiments.

As an example, for each merchant there are typically four different parsing templates which can be used for electronic communications relating to purchase transactions: i) a text order confirmation template; ii) an HTML order confirmation template; iii) a text shipping confirmation template; and iv) an HTML shipping confirmation template. Where the email is an e-receipt from a brick and mortar purchase, another template may be used that is specific to the merchant. For some online merchants there are greater or fewer templates depending upon what are the various forms of email messages a given online merchant typically sends. Regardless of the number of templates for a given merchant, each template is specific as to the known particular entities typically included and the order they typically occur within each type of email confirmation message sent by that merchant.

The above describes parsing of email purchase order confirmation, shipping confirmation, or e-receipt data. As mentioned, a customer may scan and save paper receipts, typed or printed notes, invoices, bills of sale, and the like in a storage device or print and save purchase order and shipping confirmation communications sent to the customer by the merchant via a web page. In this instance, the aggregation computing system 20 may first perform optical character recognition "OCR" on the scanned or printed receipts prior to performing the processing performed above. Further, a customer may maintain an online account with a merchant containing purchase data information. In this instance, the aggregation computing system 20 will access the data online via communication with merchant computing system to retrieve this data. The aggregation computing system 20 may use column and/or row headers associated with the online data to parse the data, or it may use procedures similar to the above and discussed below to parse the data into appropriate fields.

Returning to data processing procedures, in some embodiments, context-free grammars "CFGs" are used to parse fields from purchase transaction data. In some embodiments, instead of using grammars for parsing natural language (e.g., English) structures, the system may use defined smaller grammars describing a particular message format, for example: "(Greetings from merchant)(Details about order)(Details about item 1)(Details about item 2) . . . (Details about item N)(Tax and totals calculation)," and the like. Further, the CFGs may be individually defined, such as in a Backus-Naur Form (BNF) format, or templates may be used for data extraction. In instances where templates are used, these created templates are grammar and can be converted by known tools, such as Another Tool for Language Recognition "ANTLR", into mail-specific grammars or e-receipt-specific grammars or online customer account information-specific grammars. ANTLR is then used again to convert these grammars into extraction parsers, which can be used by the aggregation computing system 20 to parse the email message bodies, e-receipt bodies, online data, etc. to extract the entities of interest from them. Examples of such extracted entities include merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like.

Other extraction parsers may be used, such as regular expression extraction, which can be used as a brute force pattern matching approach across the purchase information record. With this technique, each word in a given purchase order record is matched against a set of rules. If the rules are met, the piece of text matching the set of rules is returned. For example, shipping companies frequently use a 21 digit tracking number beginning with "1Z" or "91." The aggregation computing system may scan an entire purchase information record to find a 21 digit number with "1Z" or "91" as the first 2 digits. The matched text can then be extracted and used to determine shipping information.

In another embodiment, an HTML document object model (DOM) approach may be used to parse purchase data records. For example, the message body of an email shipping notification may contain HTML code with tags for order, shipping and/or tracking information. The aggregation computing system may use these tags to identify the shipping and/or tracking information for extraction.

Once relevant information is extracted from communications between the customer and merchant regarding purchase transactions, it is stored in purchase data records in a structured database 24.

As is understood, once the purchase transaction data has been extracted, various information regarding a particular purchase transaction is now known, such as merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like. This data can be further enriched with additional and/or updated information associated with products or services within the data. For example, the data may be enriched with updated shipping and delivery information from a shipping company computer system 26, product images, information about product returns, warranty information, recall information, and the like. In particular, the aggregation computing system may (1) communicate with the merchant and/or shipping company to update the shipping and delivery information extracted and stored in the database, (2) may search the merchant or the web in general to retrieve product images, and/or (3) communicate with the merchant for return policies, warranties, insurance, recalls, and the like.

The above is a description of an aggregation computing system according to one embodiment of the present invention. An example of an aggregation computing system is described in U.S. Published Patent Application No. 2013/0024525 titled Augmented Aggregation of Emailed Product Order and Shipping Information, the contents of which are incorporated herein by reference.

Turning now to FIG. 2, a high-level flow chart of a method of using product level data for marketing is provided. In some embodiments, the method includes providing an offer to a customer by receiving unstructured data from a customer account, wherein the unstructured data comprises product level data for a transaction; converting, via computing device processor, the unstructured data into structured data; determining, via a computing device processor, a transaction at a financial institution corresponding to the structured data; determining, via a computing device processor, an offer for a customer based on the product level data and the transaction; and providing the offer to the customer.

In block 202, the system receives unstructured data from a customer account. In an embodiment, the system receives the unstructured data via a network, such as a wired or wireless network. In an exemplary embodiment, the unstructured data is received via the Internet. For example, the unstructured data may be received via the system accessing a customer's account on an external website. In one example, the customer provides the customer's log-in credentials, e.g., username and password, and the system logs into the customer's account to access the unstructured data. In an embodiment, the system logs into the customer's account with the customer's permission and scans the account for unstructured data that may be associated with transaction data. For example, the system may identify an e-receipt from an e-commerce retailer. The system may also log into a history of the customer's transactions at an e-commerce retailer to access unstructured data.

In another embodiment, the customer provides the unstructured data to the system. For example, the customer may forward the e-receipt email to an email account associated with the system. In one embodiment, the email account associated with the system is unique to the customer. In a further embodiment, the email account is an account that receives unstructured data from more than one customer. For example, a generic account may be set up to receive unstructured data from multiple customers. The system evaluates the unstructured data for both transaction-associated information as well as customer-identifying information.

In some embodiments, the system receives the unstructured data on a regular basis. For example, the system may automatically log into a customer account on a regular basis to determine transaction data. In another embodiment, the system receives the unstructured data after being triggered by the customer. For example, the customer may request an update of unstructured data. In another example, the customer completes a transaction at an e-commerce retailer and the withdrawal from the customer's financial account is the trigger that causes the system to receive the unstructured data. The system may determine that an e-commerce transaction has occurred, determine an e-commerce site associated with the e-commerce transaction, and receive the unstructured data from the e-commerce site.

In an embodiment, the customer account is the history of the customer's transactions and other actions with a third party entity, such as an e-commerce website. For example, some websites keep records of transactions conducted by customers at the website. The customer may be able to access these records, such as by entering a username and password, in order to view a record of the transactions conducted by the customer. In many websites, the records include the products purchased and other product-level data and transaction data regarding the transaction.

In an embodiment, unstructured data are data that do not comply to a uniform structure. For example, a first merchant may include data in a first format and a second merchant may use a completely different format for providing information to the customer. In some embodiments, a merchant will use different formats for different types of communication to a customer. For example, an e-receipt acknowledging a transaction may have a first format while a shipping confirmation acknowledging shipment of the products may have a second format.

In some embodiments, the unstructured data includes product level data for a transaction. Product level data is information on the products and/or services associated with a transaction. Product level data may include the name of the product, a category for the product, a code associated with the product (e.g., a SKU code, a serial number, or the like), and/or warranty information for the product. The product information separates the transaction from a single non-informational record at the financial institution into a data-rich set that the financial institution, the customer, and/or third parties may use. In some embodiments, the product-level data is used to provide appropriate or desirable offers to customers.

In some embodiment, the unstructured data also include transaction level data, such as the date of the transaction, the total amount of the transaction, the location of the transaction, the merchant associated with the transaction, the category of the merchant, any contact information for the merchant, and the like.

A transaction may be any interaction between one party and at least one more party. In an exemplary embodiment, a transaction is a purchase of a good or service by one party from a second party. A transaction may also be a sale of a product or service, a barter or trade for a product or service, or the like.

In block 204, the system determines a format of the unstructured data. The format of the unstructured data is the layout and structure of the communication that embeds the unstructured data. For example, an email e-receipt from a first merchant may have the merchant name at the top of the email the product names on the left hand side of the email, the cost of each item on the right hand side, and shipping information on the bottom. A second merchant, however, may have the product-level and transaction-level data at different locations in the email. The system determines the information by evaluating the images in the email, by using text recognition software, and by evaluating the underlying codes for the information. For example, the system may evaluate the hypertext markup language code to determine generic codes that a merchant uses for different types of information.

In an embodiment, the system retains a copy of the format used by a merchant. For example, many merchants use the same format for their communications with different customers. While the content of the communication may change, e.g., the products purchased differs, the format of the communication remains the same. By saving this format, the system increases the speed with which the system can identify the unstructured data. In an embodiment, the system determines a diagnostic feature of the e-receipt or communication, such as a merchant name, and then determines a format for the merchant communication from a database.

In block 206, the system converts the unstructured data into structured data based on the format. Once the system has determined the format of the communication, the system is able to convert the unstructured data in the communication into structured data that the system may use for many different purposes. For example, the system may determine that the e-receipt is from a first merchant using a specific format. The system uses the known format to determine what information in the e-receipt is the product-level data, e.g., determines which information in the e-receipt is products that were purchased compared to products that were merely recommended to the customer by the merchant.

In block 208, the system determines a transaction at a financial institution corresponding to the structured data. The structured data is data that shares a common format accessible to the system. In this manner, the system is able to compare the structured data from the transaction to data associated with transactions at a financial institution, which are also in a structure accessible to the system. It should be understood that the structures do not necessarily have to be the same. So long as both the structured data from the e-receipt and the data from the financial institution are accessible to the system, then the system can determine a transaction at the financial institution corresponding to the structured data.

The system may determine the corresponding transaction by comparing elements of the structured data and the transaction data. For example, the amount, the date, the merchant, and/or the location may be used to determine a corresponding transaction. In some embodiments, the system determines corresponding transactions within a certain confidence level, such as by determining a likelihood that the structured data and the transaction would share selected elements at random. When the likelihood is very small e.g., below a predetermined threshold, that the similarities between the structured data and the transaction would occur at random, the system determines that the structured data corresponds to the transaction.

In block 210, the system determines an offer for the customer based on the product level data and the transaction. In an embodiment, the product level data and the transaction are used to provide an offer desirable to the customer based on the products and characteristics of the products. For example, the offer may be based on a better price for a similar product, better warranties associated with the product, a replacement product, an offer to test a similar product, e.g., test drive a car, and the like.

For example, the product level data and the transaction data allow the system to determine the date that a specific product was purchased. Many products have a natural lifespan such that their efficacy wears out over time, they naturally get work down based on standard use, or related products or services are needed after a certain period of time. In one example, over the counter medicines may lose their efficacy after a certain period of time. The system may provide the customer an offer to purchase the over the counter medicine again at the expiration of that time period, perhaps also with a discount or suggested merchant. In another example, an oil change on a car is recommended every six months. The system is able to determine that the customer had an oil change performed based on the product level data and recommends that the user have another one at six months from the date. This points to another advantage of the system; the system is able to determine if the customer has already had an oil change and may not recommend the oil change at six months if it is determined that the customer conducted a transaction and product level data indicates an oil change at five months. In a still further example, a leather couch may require treatment every year. The system determines that the customer purchased a leather couch via the product level data and recommends that the customer purchase leather treatment at the one year anniversary of the couch purchase.

In some embodiments, a location associated with the product level information and/or transaction level information is used to determine the offer. For example, the e-receipt may provide product level date associated with a location. A customer may receive an email itinerary after purchasing an airline ticket. The system evaluates the email itinerary, extracts the travelers, destination, and dates, and determines an offer for the customer based on the destination. For example, the customer may purchase an airplane ticket to a different state. Typically, the financial institution would only see that a purchase occurred via an airline or travel agent. The destination would not be available to the financial institution. After extracting information from the emailed itinerary, however, the system is able to provide targeted offers to the customer based on the destination and in some cases the dates of travel.

In another example, the system provides offers related to nearby products associated with a customer's previous purchases. For example, the system may determine that a customer purchased a product from an online merchant or from a city thirty miles from the location of the customer's mailing address associated with an account. The system may provide an offer for the product located near to the customer. For example, the system may determine that the customer typically orders a specific type of product online. The system determines, via a database associated with merchants, that the product is available within a predetermined distance, e.g., five miles, from the customer's residence based on the customer account data. The system provides an offer to the customer to purchase the product at the proximate location, thereby assisting the customer. In an embodiment, the availability of the product is also confirmed prior to recommending the location to the user. For example, the system may sync with a merchants stock availability computer system to determine the presence of a product at a specific location.

In a further embodiment, the product information and transaction location is used to provide offers to a customer. For example, the system may determine the location of the transaction via one of a variety of means, including the identity of the merchant, a positioning system device in the customer's mobile device, input by the customer, and the like. The system determines product level information regarding a transaction at a specific location and then provides offers to the customer, wherein the offers are proximate to the current location of the customer. In an example, a customer may conduct a withdrawal at an ATM. The system determines the customer's location based on the location of the ATM and alerts the customer to the location of a museum three blocks away which the customer may have free access to as a perk of being a customer of the financial institution.

In an embodiment, the offers are communication offers that provide information and/or data relating to a product purchased. For example, the communication offer may provide information in a product review guide or buyers guide for the same product or for products that are related to at least one of the products purchased. The offer may also be an offer to purchase a service manual, user guide, or other informational package related to a product or service. In another embodiment, the offer is a notification about a product purchased, such as a recall notice.

In another embodiment, the offers are directed to related products or services based on the product level data and the transaction level data. For example, the system may determine that the customer purchased the first model of a bicycle two years ago and that the third model is out now. The system uses this information to provide an offer to the customer to purchase the third model, including information on the advances made between the first and the third model. In a further embodiment, the offer may be an offer to buy back at least one of the products in an earlier purchase, alone or in combination with the offer to purchase a new version.

In a still further embodiment, the offer is an offer to try something based on information in the product level data and transaction level data. For example, the customer may rent a specific type of car. The system determines this and sends an offer to the customer to test drive the car at a dealership. In another embodiment, the customer purchases a product associated with a specific type of car such as a poster, a model, or an item associated with a car (e.g., a keychain fob), and then the system offers a deal on a rental of the car at a later date.

In a further embodiment, the system pushes product level information to a merchant to solicit offers for the customer. For example, the system may push product level information indicating that a customer purchased a product produced by a manufacturer to the manufacturer, with the customer's permission. The merchant responds by providing an offer, as described herein, to the customer via the system. For example, the merchant may offer a rebate or information package relating to the purchase.

In block 212, in some embodiments the system provides the offer to the customer. The system may provide the offer to the customer via an email, a text message, a direct mail message, or other audio and/or visual method. In some embodiments, the offer is provided to the customer after a period of time determined by the system. For example, the offer may be provided at the expiration of the warranty period for one of the product or at the expiration of the natural period of use for a product.

Turning now to FIG. 3, an exemplary embodiment of an e-receipt associated with the method is provided. In this example, the e-receipt 300 is an email receipt from a merchant. As discussed, in other embodiments the e-receipt may be a confirmation webpage from a merchant, an account page of a merchant, text message information, or the like. In some embodiments, the e-receipt includes various types of information including: (a) merchant information; (b) transaction information; and (c) product or service information. While this example, includes at least some of each type of information, it should be understood that the e-receipt does not necessarily require each type of information. For example, the merchant information may be missing but the system and method may still be able to match the e-receipt with a transaction and identify the products and services associated with the transaction to assist with marketing.

The merchant information may include the merchant name 302 or a link to the merchant's webpage 304, as shown. In further embodiments, additional merchant information is included in the e-receipt, such as contact information, address, merchant type or category, internet information for the merchant such as web address, and the like. The merchant information can be used to assist in marketing to the customer at a later date. For example, the system may provide an offer to the customer based on the merchant name or category, or the fact that a specific product was purchased at the merchant.

The transaction information may also be included in the e-receipt. For example, the date of the transaction 306, the total amount of the transaction 308, other costs associated with the transaction such as shipping 310 and tax 312, and the delivery address 314 for the transaction. In further embodiments, the transaction information may include the transaction time, the transaction location, the channel for payment of products associated with the transaction (e.g., credit card, account transfer, gift card, or the like), or other information associated with the transaction generally. Again, the transaction information may be used to market products and/or services to the customer in the future. For example, the date of the transaction can be tracked and then an offer to replace a product purchased in the transaction made at a predetermined time period, such as one year, from the initial transaction date.

The product information may include product-level information 316 on the products and services associated with the e-receipt. As discussed, in an embodiment, the product level information is SKU codes for products or services purchased during a transaction. The product level data may also be images of the products purchased, text describing the products purchased, or other information that the system is configured to identify and determine as indicating a product or service. In an embodiment, a specific model and/or serial number of a product is determined from the e-receipt. The product level information may also include the price paid for the product or service.

In FIG. 4, an exemplary screenshot of an account register at a financial institution is provided, in accordance with an embodiment of the invention. The account register 400 may include various information pages, such as pages on accounts 402, transfers 404, and customer service 406. In some embodiments, the accounts pages include information on transactions in various accounts, e.g., checking, credit card, savings, investment, and the like. As shown, for example, the checking account register may include the date 408 that a transaction occurred or cleared, a description of the transaction 410, the amount of the transaction 412, and the balance 414 of the account after the transaction clears.

The date of the transaction may be the actual date that the transaction occurred, the date that the financial institution received notice of the transaction, an indication that the transaction is still in processing, or some other date associated with the transaction. For example, a check card may immediately update on the transaction register when it is used to complete a transaction at a store. In contrast, a written check may occur on a first day and the written check may clear on a second day. For this reason, in some embodiments the system is configured to associate the transaction with the e-receipt within a window of time. For example, the e-receipt may show a transaction date of Monday but the transaction shows a date of Tuesday. The system may still associate the two items together even though they appear to have occurred on different days if the system is able to determine within a specified confidence level, e.g., 90%, 95%, 99%, and the like, based on other characteristics of the transaction and the e-receipt.

As discussed the description in the transaction register is typically very general. In some embodiments, the transaction register is updated with information based on the system. For example, the customer may select 416 a transaction, e.g., select a radio button or the like, and the information or offers 418 determined by the system may be presented to the customer in the transaction register. In some embodiments, offers are also provided to the customer. For example, links to offers may be presented on the transaction register, pop-up windows may present offers, or the like.

As discussed, financial institution do not receive detailed information on transactions. Instead, as shown, the account register discloses high-level information such as the channel by which the transaction occurred. For example, the channel may include a check card, an ATM withdrawal, a check, a transfer, and the like. FIGS. 5-7 provide exemplary offers to customers based on product-level transaction data associated with a transaction.

FIG. 5 provides an exemplary offer to replace a product for a customer based on a new or related product. In the offer displayed in FIG. 5, the product level and transaction level data, e.g., the specific model of bicycle and date that the bicycle was purchased, are used to provide relevant offers to the customer. For example, the system may determine that the customer purchased the first model of a specific product. The system determines that a different model is available, e.g., a newer model, and provides an offer to the customer to purchase the new model as well as an explanation of the benefits of the new model. In an embodiment, the comparison data for the product purchased compared to the product offered are available in a database. In some embodiments, multiple offers are provided, such as offers to replace the product with a related product as well as the advantages of doing so. In a still further embodiment, the offer includes an offer to purchase the product at a specific merchant as well as the benefits of doing so.

FIG. 6 provides an exemplary offer alerting a customer to a recall of a product. In the offer displayed in FIG. 6, additional product level and transaction level information is provided to customer to assist in complying with the recall. For example, the merchant where the product was purchased is provided to the customer so that the customer can bring the product back to the same merchant to facilitate the recall. In some embodiments, the offer supplements the product level and transaction level information with current information, such as the contact information to discuss the issue presented in the offer. It should be understood that offers may provide information on any post-transaction development, such as warranty requests, returns, and the like.

FIG. 7 provides an exemplary offer for a product based on length of time since previous purchase. In this example, a medicine having a shelf-life of XX months was purchased. Nearing the end of the time, the system generates an offer to the customer alerting the customer to the fact that the medicine is reaching its shelf life and providing offers to the customer for replacement. As shown, multiple competing offers may be provided. Because the system has both product level information and transaction information, the system is able to provide appropriate offers based on time since purchase of specific product.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing an offer to a customer, the system comprising:
   a computer apparatus including a processor and a memory; and
   a software module stored in the memory, comprising executable instructions that when executed by the processor cause the processor to:
   receive unstructured product level data from a customer email account for a product associated with a transaction between a customer and a merchant, wherein the unstructured product level data comprises an image of the product, a period of time since the transaction, a lifespan of the product, and at least one of a transaction amount, a transaction date, a name of the merchant, and a location of the transaction;
   convert the unstructured product level data into structured product level data, wherein converting the unstructured product level data into structured product level data includes extracting additional product level detail information from the image of the product by evaluating the image, using text recognition software and by evaluating underlying code of the image, and wherein the additional product level detail comprises at least one of an SKU code of the product, a serial number of the product, and a name of the product;
   receive corresponding transaction data from the merchant, wherein the corresponding transaction data comprises at least the transaction amount, the transaction date, the name of the merchant, and the location of the transaction, and wherein at least one of the transaction amount, the transaction date, the name of the merchant, and the location of the transaction matches with the structured product level data;

determine an offer for the customer based on the structured product level data and the corresponding transaction data, wherein the structured product level data used to determine the offer comprises at least the period of time since the transaction and the lifespan of the product; and provide the offer to the customer.

2. The system of claim 1, further comprising executable instructions that when executed by the processor cause the processor to determine a format of the unstructured product level data.

3. The system of claim 2, wherein converting the unstructured product level data into structured product level data is based at least in part on the format.

4. The system of claim 1, wherein unstructured product level data is received from a source selected from a group consisting of a customer email account and a customer account page.

5. The system of claim 1, wherein the unstructured product level data is present in an e-receipt.

6. The system of claim 1, wherein the structured product level data used to determine the offer further comprises at least a portion of the additional product level detail.

7. A computer program product for providing an offer to a customer, the computer program product comprising:
a non-transitory computer readable storage medium having computer readable program code embodied therewith, the computer readable program code comprising:
a computer readable program code configured to receive unstructured product level data from a customer email account for a product associated with a transaction between a customer and a merchant, wherein the unstructured product level data comprises an image of the product, a period of the time since the transaction, a lifespan of the product, and at least one of a transaction amount, a transaction date, a name of the merchant, and a location of the transaction;
a computer readable program code configured to convert the unstructured product level data into structured product level data, wherein converting the unstructured product level data into structured product level data includes extracting additional product level detail information from the image of the product by evaluating the image, using text recognition software and by evaluating underlying code of the image, and wherein the additional product level detail comprises at least one of an SKU code of the product, a serial number of the product, and a name of the product;
a computer readable program code configured to receive corresponding transaction data from the merchant, wherein the corresponding transaction data comprises at least the transaction amount, the transaction date, the name of the merchant, and the location of the transaction;
a computer readable program code configured to determine an offer for the customer based on the structured product level data and the corresponding transaction data, wherein the structured product level data used to determine the offer comprises at least the period of time since the transaction and the lifespan of the product; and
a computer readable program code configured to provide the offer to the customer.

8. The computer program product of claim 7, further comprising a computer readable program code configured to determine a format of the unstructured product level data.

9. The computer program product of claim 8, wherein converting the unstructured product level data into structured product level data is based at least in part on the format.

10. The computer program product of claim 7, wherein unstructured product level data is received from a source selected from a group consisting of a customer email account and a customer account page.

11. The computer program product of claim 7, wherein the unstructured product level data is present in an e-receipt.

12. The computer program product of claim 7, wherein the structured product level data used to determine the offer further comprises at least a portion of the additional product level detail.

13. A method for providing an offer to a customer, the method comprising:
receiving unstructured product level data from a customer email account for a product associated with a transaction between a customer and a merchant, wherein the unstructured product level data comprises an image of the product, a period of time since the transaction, a lifespan of the product, and at least one of a transaction amount, a transaction date, a name of the merchant, and a location of the transaction;
converting, via computing device processor, the unstructured product level data into structured product level data, wherein converting the unstructured product level data into structured product level data includes extracting additional product level detail information from the image of the product by evaluating the image, using text recognition software and by evaluating underlying code of the image, and wherein the additional product level detail comprises at least one of an SKU code of the product, a serial number of the product, and a name of the product;
determining, via a computing device processor, an offer for the customer based on the structured product level data and the corresponding transaction data, wherein the product structured level data used to determine the offer comprises at least the period of time since the transaction and the lifespan of the product; and
providing the offer to the customer.

14. The method of claim 13, further comprising determining a format of the unstructured product level data.

15. The method of claim 14, wherein converting the unstructured product level data into structured product level data is based at least in part on the format.

16. The method of claim 13, wherein unstructured product level data is received from a source selected from a group consisting of a customer email account and a customer account page.

17. The method of claim 13, wherein the structured product level data used to determine the offer further comprises at least a portion of the additional product level detail.

* * * * *